(12) United States Patent
Bhagvath

(10) Patent No.: US 11,277,307 B2
(45) Date of Patent: Mar. 15, 2022

(54) CONFIGURING MANAGED DEVICES WHEN A NETWORK MANAGEMENT SYSTEM (NMS) IS NOT REACHABLE

(71) Applicant: Cisco Technology, Inc., San Jose, CA (US)

(72) Inventor: Mahasen Bhagvath, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 299 days.

(21) Appl. No.: 16/360,949

(22) Filed: Mar. 21, 2019

(65) Prior Publication Data
US 2020/0304371 A1 Sep. 24, 2020

(51) Int. Cl.
*H04L 12/24* (2006.01)
*H04L 29/08* (2006.01)
*H04L 41/084* (2022.01)
*H04L 69/324* (2022.01)
*H04L 41/0654* (2022.01)
*H04L 41/0695* (2022.01)

(52) U.S. Cl.
CPC ...... *H04L 41/0846* (2013.01); *H04L 41/0654* (2013.01); *H04L 41/0695* (2013.01); *H04L 69/324* (2013.01)

(58) Field of Classification Search
CPC ............. H04L 41/0846; H04L 41/0654; H04L 41/0695; H04L 69/324
See application file for complete search history.

(56) References Cited

U.S. PATENT DOCUMENTS

| 5,408,618 | A | 4/1995 | Aho et al. | |
|---|---|---|---|---|
| 6,931,441 | B1* | 8/2005 | Roden | H04L 41/0893 370/230 |
| 7,864,704 | B2 | 1/2011 | Lee et al. | |
| 8,402,120 | B1* | 3/2013 | Perkinson | H04L 41/0813 709/221 |
| 9,391,842 | B2 | 7/2016 | Abbas | |
| 9,397,883 | B2 | 7/2016 | Warszawski et al. | |
| 2009/0083398 | A1* | 3/2009 | Ford | G06F 15/16 709/220 |
| 2010/0268803 | A1* | 10/2010 | Calippee | H04L 41/0843 709/221 |
| 2010/0299419 | A1 | 11/2010 | Ramankutty et al. | |

(Continued)

*Primary Examiner* — Mohamed Ibrahim
(74) *Attorney, Agent, or Firm* — Merchant & Gould P.C.

(57) ABSTRACT

Configuring managed devices when a Network Management System (NMS) is not reachable may be provided. First, a first network device in a network may determine that the first network device has a configuration issue. Determining the configuration issue may comprise determining that the first network device needs to be configured and determining that the first network device cannot connect to the NMS. Next, the first network device may determine, in response to determining that the first network device has the configuration issue, that a second network device in the network was configured by the NMS. Then, in response to determining that the second network device was configured by the NMS, the first network device may obtain second network device configuration data from the second network device. The first network device may then be configured with data comprising at least a portion of the second network device configuration data.

20 Claims, 4 Drawing Sheets

(56) References Cited

U.S. PATENT DOCUMENTS

2012/0102166 A1* 4/2012 Wackerly ............ G06F 11/3006
709/222
2015/0180709 A1* 6/2015 Warszawski ........ H04L 43/0811
709/223

* cited by examiner

CONFIGURING MANAGED DEVICES WHEN A NETWORK MANAGEMENT SYSTEM (NMS) IS NOT REACHABLE

TECHNICAL FIELD

The present disclosure relates generally to configuring managed devices.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
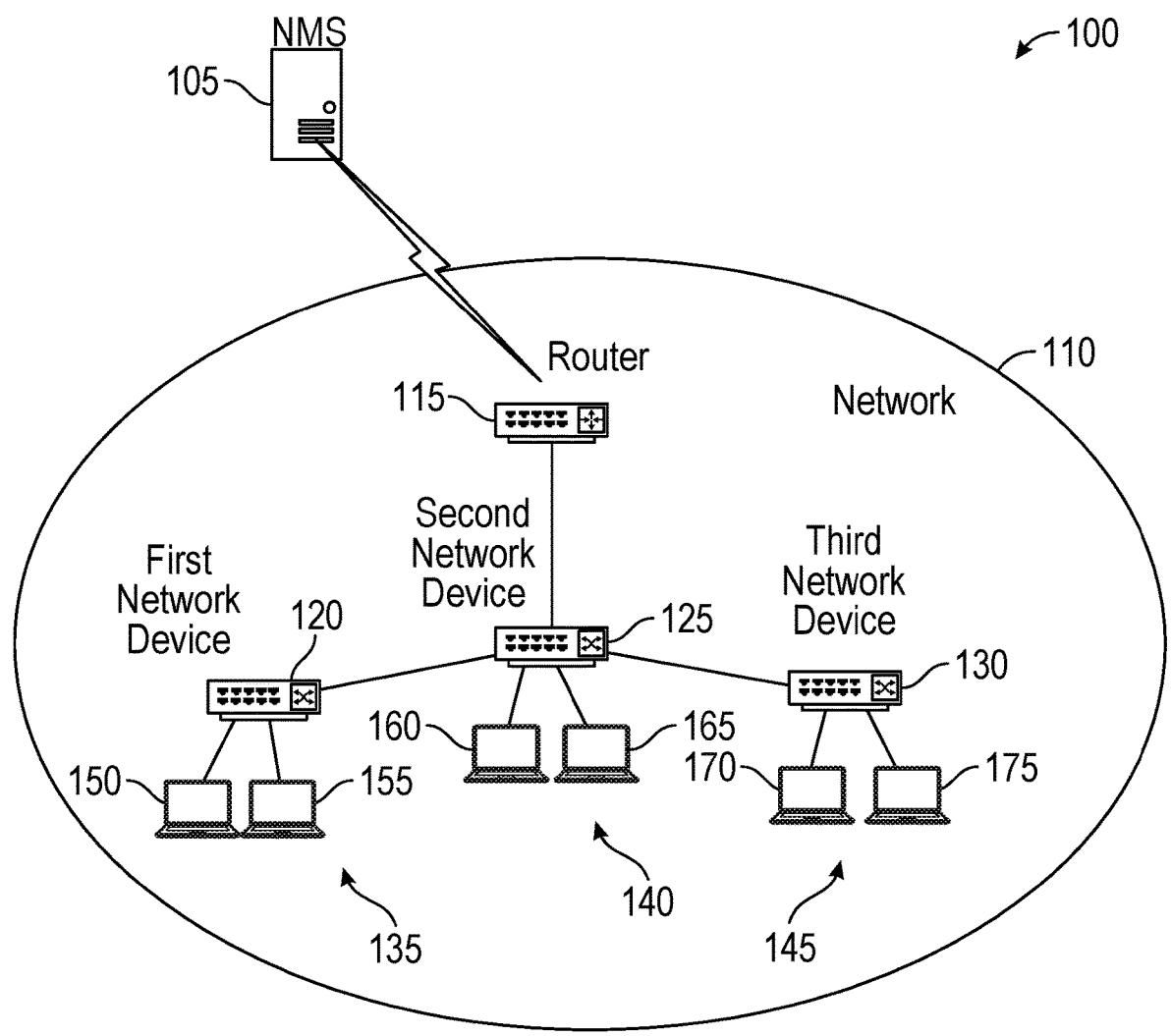
FIG. 1 shows an operating environment for configuring managed devices when a Network Management System (NMS) is not reachable.

Configuring managed devices when a Network Management System (NMS) is not reachable may be provided. First, a first network device in a network may determine that the first network device has a configuration issue. Determining the configuration issue may comprise determining that the first network device needs to be configured and determining that the first network device cannot connect to the NMS. Next, the first network device may determine, in response to determining that the first network device has the configuration issue, that a second network device in the network was configured by the NMS. Then, in response to determining that the second network device was configured by the NMS, the first network device may obtain second network device configuration data from the second network device. The first network device may then be configured with data comprising at least a portion of the second network device configuration data.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Auto configuration of network devices may be performed on an enterprise network in order to minimize manual intervention by a network administrator. For example, a group of managed network devices (e.g., switches or routers) in the enterprise network may be managed by a Network Management System (NMS). These managed network devices may be provided with automatic configuration such as, but not limited to, Power On Auto Provisioning (POAP). If a connection between the enterprise network and the NMS is lost, any new managed network device connected to the enterprise network or an existed managed network device with its configuration erased (i.e., write erase and reload) may receive their configuration only when the connection to the NMS is reestablished. Otherwise, manual intervention by the network administrator may be required to configure the new managed network device or configuration erased network device.

Consequently, until the connection to NMS is reestablished or until there is a manual intervention by the network administrator, these managed network devices may not be functional even though they are powered up. As a result managed network devices must wait for configuration from the NMS or for manual intervention to be provided. If the managed network devices are located in a remote branch office, manual intervention may be difficult and time consuming. Embodiments of the disclosure may provide a way to overcome this problem, so that when a new network device or a configuration erased network device is waiting for auto configuration from the NMS and the NMS is not reachable, then the network device may obtain some base configuration from one or more of its neighbor devices on the network. Accordingly, with embodiments of the disclosure, when the NMS is not reachable, the managed network device may be functional with some base configuration until the NMS becomes reachable again. This may be achieved without manual intervention by the network administrator.

FIG. 1 shows an operating environment 100 for configuring managed devices when an NMS is not reachable. As shown in FIG. 1, operating environment 100 may comprise an NMS 105 and a network 110. NMS 105 may collect information about network 110. This information may be used in provisioning network 110, such as installing and configuring network devices. NMS 105 may also perform maintenance on network 110, such as upgrading software on network devices and creating new virtual networks. NMS 105 may be located outside network 110, for example, in a cloud environment.

Network 110 may comprise, but is not limited to, an enterprise network that may comprise an enterprise's communications backbone that may connect computers and related devices across departments and workgroup networks, facilitating insight and data accessibility. As shown in FIG. 1, network 110 may comprise a router 115, a first network device 120, a second network device 125, and a third network device 130. A first plurality of end use devices 135 may be connected to first network device 120. A second plurality of end use device 140 may be connected to second network device 125. A third plurality of end use device 145 may be connected to third network device 130. First plurality of end use devices 135 may comprise a first end use device 150 and a second end use device 155. Second plurality of end use devices 140 may comprise a third end use device 160 and a fourth end use device 165. Third plurality of end use devices 145 may comprise a fifth end use device 170 and a sixth end use device 175.

Router 115 may comprise a Wide Area Network (WAN) router that may connect network 110 to an external network, for example, the Internet. When NMS 105 is located outside network 110, router 115 may connect NMS 105 with network devices (e.g., first network device 120, second network device 125, and third network device 130) in network 110. First network device 120, second network device 125, and third network device 130 may each comprise a computer networking device (e.g., a switch) that connects devices in network 110 by using, for example, packet switching to receive, process, and forward data to and from end use devices on network 110.

Each of first end use device 150, second end use device 155, third end use device 160, fourth end use device 165, fifth end use device 170, and sixth end use device 175 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device capable of accessing and using network 110.

The elements described above of operating environment 100 (e.g., NMS 105, router 115, first network device 120, second network device 125, third network device 130, first end use device 150, second end use device 155, third end use device 160, fourth end use device 165, fifth end use device 170, and sixth end use device 175) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Consistent with embodiments of the disclosure, first network device 120 may comprise a device with a configuration issue. A configuration issue, for example, may comprise a situation where first network device 120 may comprise a new device that has not yet been configured and NMS 105 may be unreachable by first network device 120. A configuration issue may also include the situation, for example, when first network device 120 had been previously configured, but has had its configuration erased or lost, and NMS 105 may be unreachable by first network device 120. During a configuration issue, first network device 120 may not be functioning even though it may be powered up. Accordingly, as described in greater detail below, embodiments of the disclosure may provide a process by which configurations, images, routes, etc. may be securely transferred between network devices when one of the network devices is experiencing a configuration issue and the NMS is unreachable.

Figure 2:
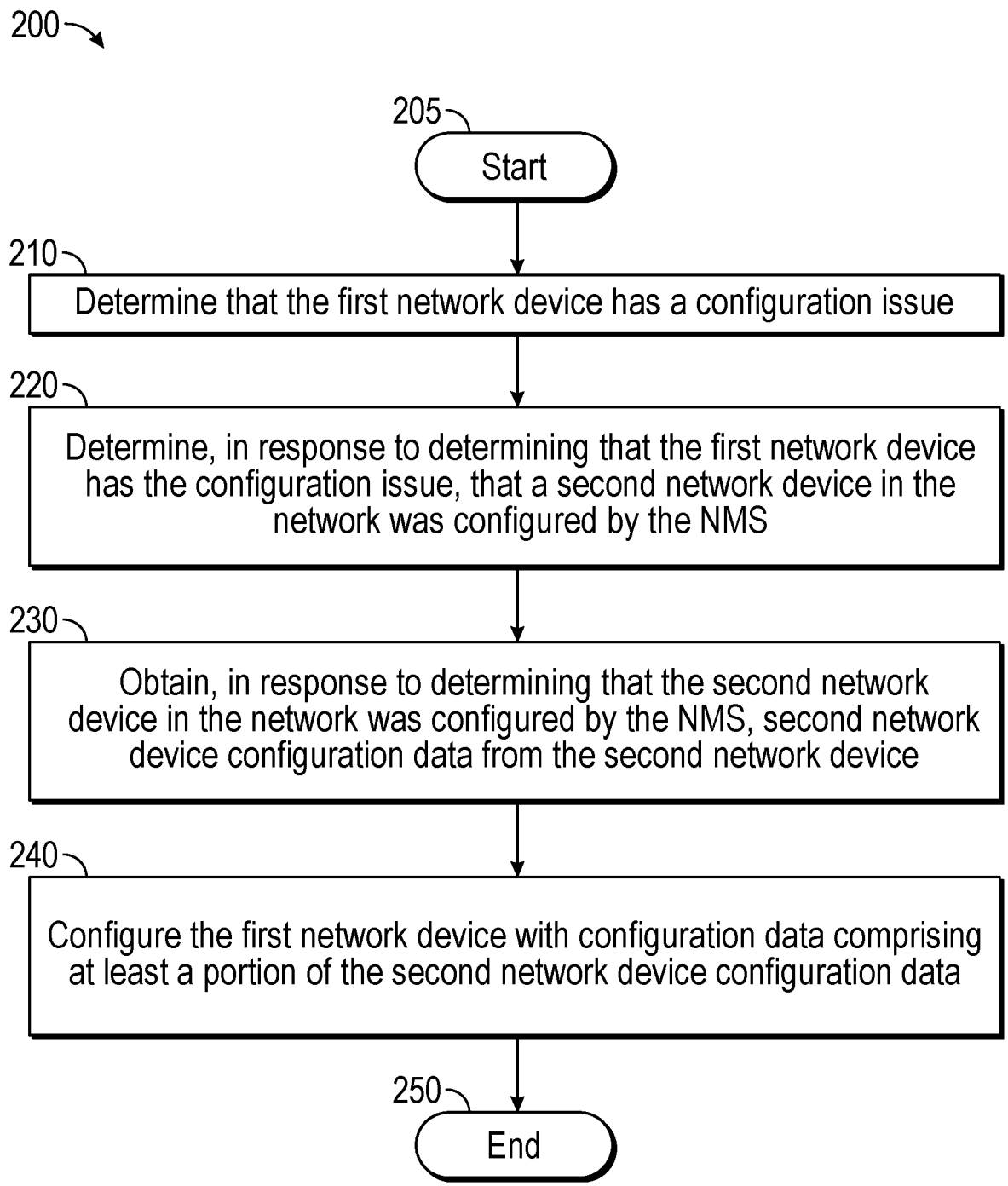
FIG. 2 is a flow chart of a method for providing configuration of managed devices when a Network Management System (NMS) is not reachable.

FIG. 2 is a flow chart setting forth the general stages involved in a method 200 consistent with embodiments of the disclosure for providing configuration of managed devices when NMS 105 is not reachable. Method 200 may be implemented using first network device 120 as described in more detail above with respect to FIG. 1. Ways to implement the stages of method 200 will be described in greater detail below.

Method 200 may begin at starting block 205 and proceed to stage 210 where first network device 120 may determine that first network device 120 has a configuration issue. Determining that first network device 120 has a configuration issue may comprise determining that first network device 120 needs to be configured and determining that first network device 120 cannot connect to NMS 105. For example, first network device 120, second network device 125, and third network device 130 may be up and running with first plurality of end use devices 135, second plurality of end use device 140, and third plurality of end use device 145 respectively connected to them. Router 115, first network device 120, second network device 125, and third network device 130 may have automatic configuration (e.g., POAP) enabled and may be managed through NMS 105 hosted, for example, in public cloud.

At this point, network 110 may lose connectivity to NMS 105. During this time of connection lose with MNS 105, first network device 120 may crash and lose its configuration. First network device 120 may then power itself back up using the automatic configuration after the crash. With embodiments of the disclosure, first network device 120 may determine it has a configuration issue when first network device 120 determines that it needs to be re-configured (e.g., due to the crash) and when first network device 120 determines that it cannot connect to NMS 105 to obtain the configuration. First network device 120 may determine it cannot connect to NMS 105 when it cannot reconnect itself to NMS 105 after a predetermined number (e.g., 3) of attempts.

From stage 210, where first network device 120 determines that first network device 120 has the configuration issue, method 200 may advance to stage 220 where first network device 120 may determine, in response to determining that first network device 120 has the configuration issue, that second network device 125 in network 110 was configured by NMS 105. For example, first network device 120 may communicate with its neighbor network devices (e.g., second network device 125 and third network device 130) to determine if any of its neighbor devices received their configuration from NMS 105. In this example, first network device 120 may determine from its communications with its neighbor network devices that second network device 125 and third network device 130 were configured by NMS 105.

First network device 120 may communicate with its neighbor network devices, for example, using a network link discovery protocol or Link Layer Discovery Protocol (LLDP) in order to obtain details regarding the neighbor devices' configurations. For example, first network device 120 may use proprietary Type-Length-Values (TLVs) in LLDP such as the Organizational Specific TLV (i.e., TLV type=127) to get information from its neighbors whether their configuration was obtained from NMS 105. A new Organizationally Unique Identifier (OUI) may be defined under the Organizational Specific TLVs for this purpose.

Once first network device 120 determines that second network device 125 in network 110 was configured by NMS 105 in stage 220, method 200 may continue to stage 230 where first network device 120 may obtain, in response to determining that second network device 125 in network 110 was configured by NMS 105, second network device configuration data from second network device 125. For example, first network device 120 may determine that second network device 125 and third network device 130 were configured by NMS 105. Then, first network device 120 may select second network device 125 in response to determining that second network device 125 has a lowest Media Access Control (MAC) address as compared to third network device 130 for example.

Consistent with embodiments of the disclosure, first network device 120 device may obtain configuration data from all its neighbors (e.g., second network device 125 and third network device 130) and then decide on a final configuration that may comprise configuration data obtained from second network device 125, third network device 130, or a combination of both.

First network device 120 may be configured to decide what configuration from second network device 125 it should use. For example, first network device 120 may determine its own device type and software image version and the device type and software image version of second network device 125. If the device types are similar and software version are different, first network device 120 may transfer the image from second network device 125 and upgrade itself. As another example, mutual authentication of first network device 120 and second network device 125 may be performed with public certificates (e.g., which may be burnt on chips in the network devices) to prevent configuration exchange with rogue devices. As yet another example, first network device 120 may decide on what configuration to apply from second network device 125 by applying a rule. The rule may comprise, but is not limited to, applying dot1x and RADIUS configuration from second network device 125, if first network device 120 receives Extensible Authentication Protocol (EAP) over LAN (EAPoL) packets from its end use devices (e.g., first end use device 150 and second end use device 155). In addition, other feature configurations like Access Control Lists (ACLs) and routes in management Virtual Routing and Forwarding (VRF) may be obtained by first network device 120 from second network device 125.

After first network device 120 obtains second network device configuration data from second network device 125 in stage 230, method 200 may proceed to stage 240 where first network device 120 may configure first network device 120 with configuration data comprising at least a portion of the second network device configuration data. For example, first network device 120 may become functional after applying this base configuration. As stated above, this base configuration may comprise configuration data obtained from second network device 125, third network device 130, or a combination of both. During this time, first network device 120 may be trying to re-connection to NMS 105, for example, in regular time intervals. After the connection to NMS 105 is restored, first network device 120 may obtain a full configuration from NMS 105. Once first network device 120 configures first network device 120 with the configuration data in stage 240, method 200 may then end at stage 250.

Consistent with embodiments of the disclosure, even though NMS 105 may not be reachable, a new or a configuration erased managed network device (e.g., a switch) may be operational without manual intervention. End use devices connected to new or configuration erased network devices may not be affected and may be able to access network 110. In addition, hardware upgrades may not be required, and with mutual authentication through public certificates, no configuration exchange may occur with rogue devices. Software version parity (e.g., software upgrade) may be achieved without help from NMS 105. Furthermore, embodiments of the disclosure may be helpful in remote branch office deployments, where manual intervention may be difficult and time consuming. Service outage to users connected to crashed network devices may be prevented and users may be able to access network 110 with limited functionality consistent with embodiments of the disclosure.

Figure 3:
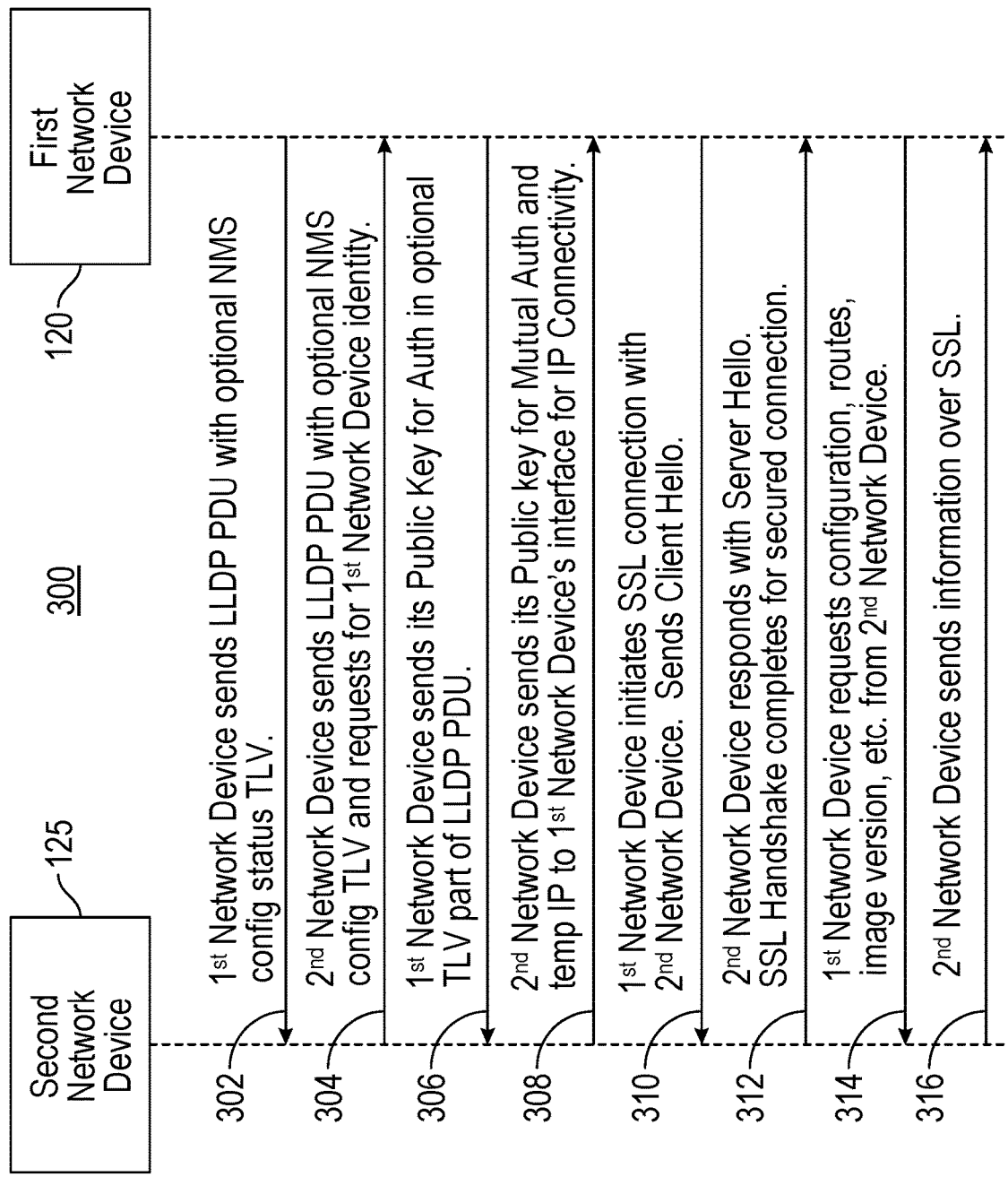
FIG. 3 is a sequence diagram of a method for providing a secured connection.

FIG. 3 is a sequence diagram setting forth the general stages involved in a method 300 consistent with embodiments of the disclosure for providing a secured connection by which first network device 120 and second network device 125 may communicate status and transfer information (e.g., configurations, images, routes, etc.) as described above with respect to stages 220 and 230 of method 200. Method 300 may be implemented using first network device 120 and second network device 125 as described in more detail above with respect to FIG. 1. Ways to implement the stages of method 300 will be described in greater detail below.

Consistent with embodiments of the disclosure, first network device 120 may send an LLDP Protocol Data Unit (PDU) to second network device 125. (Stage 302). This may comprise using an optional TLV (e.g., as described above with respect to stage 220) that may relay an NMS configuration status of first network device 120. This optional TLV may be of a single byte value with each bit describing a status. For example, this optional TLV may have the following format: i) a 1st bit (e.g., LSB bit) that may indicate whether a network device was enabled by a configuration pushed from NMS 105 (e.g., auto-configuration or POAP); ii) a 2nd bit that may indicate whether the configuration pushed from NMS 105 is available; and iii) a 3rd bit that may indicate whether NMS 105 is reachable.

Next, second network device 125 may send the aforementioned LLDP PDU with the optional NMS configuration status TLV to first network device 120. (Stage 304). With this exchange of messages in the aforementioned sample TLV specification, first network device 120 and second network device 125 may learn each other's status. At this time, second network device 125 may also request first network device 120's public key (or any equivalent) for authentication.

First network device 120 may then send its public key to second network device 125 through a LLDP PDU in the optional TLV. (Stage 306). A root Certificate Authority (CA) certificate, used to verify/authenticate the public key may be stored in a network device's persistent memory. If not, the root CA certificate may be shared through Dynamic Host Configuration Protocol (DHCP) options.

Then second network device 125 may send its public key to first network device 120 for mutual authentication. (Stage 308). Second network device 125 may also send a temporary Internet Protocol (IP) address (e.g., 10.1.1.2/24) to first network device 120's interface 1/1 along with its own interface IP address (e.g., 10.1.1.1/24) for establishing a secured IP connection between second network device 125 and first network device 120.

First network device 120 may then initiate a Secure Sockets Layer (SSL) connection with second network device 125 by sending a client hello. (Stage 310). Second network device 125 may respond with a server hello resulting in an SSL handshake to achieve a secured connection between first network device 120 and second network device 125 through their ports, for example, 1/2 (for first network device 120) and 1/1 (second network device 125). (Stage 312).

First network device 120 may request, for example, a configuration, routes, a software image (e.g., if version parity is not present) from second network device 125. (Stage 314). Image version may be shared through LLDP's mandatory TLV. In this way, first network device 120 may know if it has software version parity with second network device 125. Second network device 125 may then transfer the requested information to first network device 120 over the established secured connection. (Stage 316).

After successful transfer of information, the secured connection may be closed. Second network device 125 may flush its LLDP information. First network device 120 may check to see if the temporary IP address provided to it by second network device 125 is a duplicate. If it is a duplicate, first network device 120 may flush it. If it is not a duplicate, first network device 120 may retain it. First network device 120 may now apply the configuration (or a portions of it) received from second network device 125, which may be relevant as described above with respect to stage 240.

Accordingly, embodiments of the disclosure may provide a process by which configurations, images, routes, etc. may be securely transferred between network devices. Consequently, a network device (e.g., that may be auto-configuration enabled (POAP)) may obtain configuration, images, routes, etc. from its neighbor and become operational when its NMS is not reachable.

Embodiments of the disclosure may comprise a method. The method may comprise determining, by a first network device in a network, that the first network device has a configuration issue. Determining that the first network device has a configuration issue may comprise determining that the first network device needs to be configured and determining that the first network device cannot connect to a Network Management System (NMS). The method may further comprise, in response to determining that the first network device has the configuration issue, determining, by the first network device, that a second network device in the network was configured by the NMS. In addition, the method may comprise in response to determining that the second network device in the network was configured by the NMS, obtaining second network device configuration data from the second network device and configuring the first network device with configuration data comprising at least a portion of the second network device configuration data.

Determining that the first network device needs to be configured comprises determining that the first network device has been newly connected to the network. Determining that the first network device needs to be configured comprises determining that a configuration of the first network device has been erased.

Determining that the second network device in the network was configured by the NMS may comprise determining, by the first network device, that a plurality of network devices in the network were configured by the NMS and selecting, by the first network device, the second network device from the plurality of network devices.

Selecting the second network device from the plurality of network devices may comprise selecting the second network device in response to determining that the second network device has a lowest Media Access Control (MAC) address of the plurality of network devices. Determining that the second network device was configured by the NMS may comprise connecting, by the first network device to the second network device, using Link Layer Discovery Protocol (LLDP). Determining that the second network device was configured by the NMS may comprise connecting, by the first network device to the second network device, using an organizational Specific Type-Length-Value (TLV) with type 127 of Link Layer Discovery Protocol (LLDP).

Another embodiment of the disclosure may comprise a method. The method may comprise determining, by a first network device in a network, that the first network device has a configuration issue. Determining that the first network device has a configuration issue may comprise determining that the first network device needs to be configured and determining that the first network device cannot connect to a Network Management System (NMS). The method may further comprise determining, by the first network device in response to determining that the first network device has the configuration issue, that a second network device in the network was configured by the NMS. In response to determining that the second network device in the network was configured by the NMS, the method may comprise obtaining second network device configuration data from the second network device. In response to determining that the first network device has the configuration issue, the method may comprise determining, by the first network device that a third network device in the network was configured by the NMS. In response to determining that the third network device in the network was configured by the NMS, the method may comprise obtaining third network device configuration data from the third network device. The method may further comprise configuring the first network device with configuration data comprising a combination of at least a portion of the second network device configuration data and at least a portion of the third network device configuration data.

Yet another embodiment may comprise a system. The system may comprise a memory storage being disposed in a first network device and a processing unit coupled to the memory storage and being disposed in the first network device. The processing unit may be operative to determine that the first network device has a configuration issue. The processing unit being operative to determine that the first network device has a configuration issue may comprise the processing unit being operative to determine that the first network device needs to be configured and determine that the first network device cannot connect to a Network Management System (NMS). In response to determining that the first network device has the configuration issue, the processing unit may be further configured to determine that a second network device in the network was configured by the NMS. In response to determining that the second network device in the network was configured by the NMS, the processing unit may be configured to obtain second network device configuration data from the second network device and configure the first network device with configuration data comprising at least a portion of the second network device configuration data.

Figure 4:
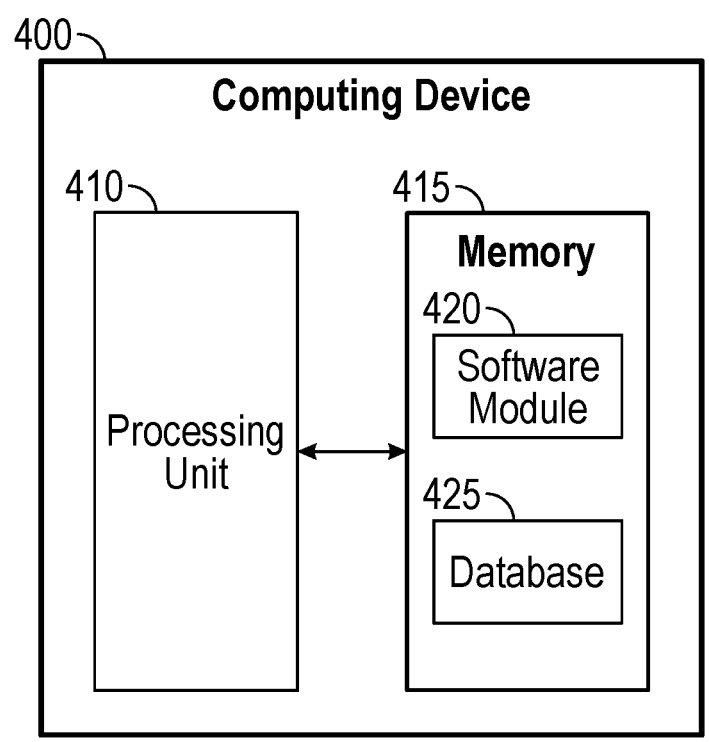
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing configuration of managed devices when NMS 105 is not reachable, including for example, any one or more of the stages from method 200 or method 300 described above with respect to FIG. 2 and FIG. 3. Computing device 400, for example, may provide an operating environment for elements of operating environment 100 including, but not limited to, NMS 105, router 115, first network device 120, second network device 125, third network device 130, first end use device 150, second end use device 155, third end use device 160, fourth end use device 165, fifth end use device 170, and sixth end use device 175. Elements of operating environment 100 (e.g., NMS 105, router 115, first network device 120, second network device 125, third network device 130, first end use device 150, second end use device 155, third end use device 160, fourth end use device 165, fifth end use device 170, and sixth end use device 175) may operate in other environments and are not limited to computing device 400.

Computing device 400 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multi-processor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining, by a first network device in a network, that the first network device has a configuration issue, wherein determining that the first network device has a configuration issue comprises:
      determining, by the first network device, that the first network device needs to be configured, and
      determining, by the first network device, that the first network device cannot connect to a Network Management System (NMS);
   in response to determining that the first network device has the configuration issue, determining, by the first network device, that a second network device in the network was configured by the NMS, wherein determining that the second network device in the network was configured by the NMS comprises:
      sending, by the first network device to the second network device, a first message comprising a first configuration status of the first network device, and
      receiving, by the first network device from the second network device in response to the first message, a second message comprising a second configuration status of the second network device, the second configuration status of the second network device indicating whether the second network device was enabled by a configuration pushed by the NMS;
   in response to determining that the second network device in the network was configured by the NMS, obtaining second network device configuration data from the second network device; and
   configuring the first network device with configuration data comprising at least a portion of the second network device configuration data.

2. The method of claim 1, wherein determining that the second network device in the network was configured by the NMS comprises:
   determining, by the first network device, that a plurality of network devices in the network were configured by the NMS; and
   selecting, by the first network device, the second network device from the plurality of network devices.

3. The method of claim 2, wherein selecting the second network device from the plurality of network devices comprises selecting the second network device in response to determining that the second network device has a lowest Media Access Control (MAC) address of the plurality of network devices.

4. The method of claim 1, wherein determining that the first network device needs to be configured comprises determining that the first network device has been newly connected to the network.

5. The method of claim 1, wherein determining that the first network device needs to be configured comprises determining that a configuration of the first network device has been erased.

6. The method of claim 1, wherein determining that the second network device was configured by the NMS comprises connecting, by the first network device to the second network device, using Link Layer Discovery Protocol (LLDP).

7. The method of claim 1, wherein determining that the second network device was configured by the NMS comprises connecting, by the first network device to the second network device, using an organizational Specific Type-Length-Value (TLV) with type 127 of Link Layer Discovery Protocol (LLDP).

8. A method comprising:
   determining, by a first network device in a network, that the first network device has a configuration issue, wherein determining that the first network device has a configuration issue comprises:
      determining, by the first network device, that the first network device needs to be configured, and
      determining, by the first network device, that the first network device cannot connect to a Network Management System (NMS);
   determining, by the first network device in response to determining that the first network device has the configuration issue, that a second network device in the network was configured by the NMS, wherein determining that the second network device in the network was configured by the NMS comprises:
      sending, by the first network device to the second network device, a first message comprising a first configuration status of the first network device, and
      receiving, by the first network device from the second network device, a second message comprising a second configuration status of the second network device, the second configuration status of the second network device indicating whether the second network device was enabled by a configuration pushed by the NMS;
   in response to determining that the second network device in the network was configured by the NMS, obtaining second network device configuration data from the second network device;
   in response to determining that the first network device has the configuration issue, determining, by the first network device that a third network device in the network was configured by the NMS;
   in response to determining that the third network device in the network was configured by the NMS, obtaining third network device configuration data from the third network device; and
   configuring the first network device with configuration data comprising a combination of at least a portion of the second network device configuration data and at least a portion of the third network device configuration data.

9. The method of claim 8, wherein determining that the second network device in the network was configured by the NMS comprises:
   determining, by the first network device, that a plurality of network devices in the network were configured by the NMS; and
   selecting, by the first network device, the second network device from the plurality of network devices.

10. The method of claim 9, wherein selecting the second network device from the plurality of network devices comprises selecting the second network device in response to determining that the second network has a lowest Media Access Control (MAC) address of the plurality of network devices.

11. The method of claim 8, wherein determining that the first network device needs to be configured comprises determining that the first network device has been newly connected to the network.

12. The method of claim 8, wherein determining that the first network device needs to be configured comprises determining that a configuration of the first network device has been erased.

13. The method of claim 8, wherein determining that the second network device was configured by the NMS comprises connecting, by the first network device to the second network device, using Link Layer Discovery Protocol (LLDP).

14. The method of claim 8, wherein determining that the second network device was configured by the NMS comprises connecting, by the first network device to the second network device, using an organizational Specific Type-Length-Value (TLV) with type 127 of Link Layer Discovery Protocol (LLDP).

15. A system comprising:
a memory storage disposed in a first network device; and
a processing unit coupled to the memory storage and disposed in the first network device, wherein the processing unit is operative to:
  determine that the first network device has a configuration issue, wherein the processing unit being operative to determine that the first network device has a configuration issue comprises the processing unit being operative to;
    determine that the first network device needs to be configured, and
    determine that the first network device cannot connect to a Network Management System (NMS);
  in response to determining that the first network device has the configuration issue, determine that a second network device in the network was configured by the NMS, wherein the processing device being operative to determine that the second network device in the network was configured by the NMS comprises the processing device being operative to:
    send, to the second network device, a first message comprising a first configuration status of the first network device, and
    receive, from the second network device, a second message comprising a second configuration status of the second network device, the second configuration status of the second network device indicating whether the second network device was enabled by a configuration pushed by the NMS;
  in response to determining that the second network device in the network was configured by the NMS, obtain second network device configuration data from the second network device; and
  configure the first network device with configuration data comprising at least a portion of the second network device configuration data.

16. The system of claim 15, wherein the processing unit being operative to determine that the second network device in the network was configured by the NMS comprises the processing unit being operative to:
  determine that a plurality of network devices in the network were configured by the NMS; and
  select the second network device from the plurality of network devices.

17. The system of claim 16, wherein the processing unit being operative to select the second network device from the plurality of network devices comprises the processing unit being operative to select the second network device in response to the second network having a lowest Media Access Control (MAC) address of the plurality of network devices.

18. The system of claim 15, wherein the processing unit being operative to determine that the first network device needs to be configured comprises the processing unit being operative to determine that the first network device has been newly connected to the network.

19. The system of claim 15, wherein the processing unit being operative to determine that the first network device needs to be configured comprises the processing unit being operative to determine that a configuration of the first network device has been erased.

20. The system of claim 15, wherein the processing unit being operative to determine that the second network device in the network was configured by the NMS comprises the processing unit being operative to connect to the second network device using an organizational Specific Type-Length-Value (TLV) with type 127 of Link Layer Discovery Protocol (LLDP).

* * * * *